United States Patent
Chetlur et al.

(10) Patent No.: US 9,787,791 B2
(45) Date of Patent: Oct. 10, 2017

(54) MANAGING A DATA CACHE FOR A COMPUTER SYSTEM

(71) Applicant: INTERNATIONAL BUSINESS MACHINES CORPORATION, Armonk, NY (US)

(72) Inventors: Malolan Chetlur, Bangalore (IN); Stuart J. Hayton, Portsmouth (GB); Zygmunt A. Lozinski, Cambridge (GB); Susan P. Paice, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 14/422,637

(22) PCT Filed: Aug. 6, 2013

(86) PCT No.: PCT/IB2013/056442
§ 371 (c)(1),
(2) Date: Feb. 19, 2015

(87) PCT Pub. No.: WO2014/030088
PCT Pub. Date: Feb. 27, 2014

(65) Prior Publication Data
US 2015/0215417 A1     Jul. 30, 2015

(30) Foreign Application Priority Data

Aug. 20, 2012 (GB) .................................. 1214824.3

(51) Int. Cl.
*G06F 15/167* (2006.01)
*H04L 29/08* (2006.01)
*G06F 17/30* (2006.01)

(52) U.S. Cl.
CPC .... *H04L 67/2842* (2013.01); *G06F 17/30902* (2013.01); *H04L 67/02* (2013.01)

(58) Field of Classification Search
CPC .... G06F 13/00; G06F 12/00; G06F 17/30902; H04L 67/2842; H04L 67/02
See application file for complete search history.

(56) References Cited

U.S. PATENT DOCUMENTS 4,464,717 A * 8/1984 Keeley ................. G06F 12/126
                                                              711/122
6,185,608 B1    2/2001 Hon et al.
(Continued)

FOREIGN PATENT DOCUMENTS

CN          1351729 A      5/2002
CN        101196912 A      6/2008
(Continued)

OTHER PUBLICATIONS

M. Kurcewicz et al., "A Filtering Algorithm for Web Caches", Elsevier Science B.V., Computer Networks and ISDN Systems, vol. 30, No. 22-23, Nov. 1998, pp. 2203-2209 (Abstract Only).
(Continued)

*Primary Examiner* — Benjamin M Thieu
(74) *Attorney, Agent, or Firm* — Mark G. Edwards

(57) ABSTRACT

A processor-implemented method manages a data cache for a computer system. One or more processors maintain a cache for one or more data resources requested by a client process. In response to a request from the client process for a cached data resource, the processors send a first request to a server process for the data resource, and a second request to the server process for an indication of whether or not the data resource has been modified since the data source was most recently cached. Responses to the first or second requests from the server process are compared with the cached data resources so as to identify whether the response to the second request is inaccurate. One or more processors disable caching for the data resource in response to a
(Continued)

predetermined number of inaccurate second requests associated with the data resource being identified.

14 Claims, 4 Drawing Sheets

(56) References Cited

U.S. PATENT DOCUMENTS

| | | | |
|---|---|---|---|
| 6,253,234 | B1 | 6/2001 | Hunt et al. |
| 6,557,076 | B1 | 4/2003 | Copeland et al. |
| 6,990,526 | B1 | 1/2006 | Zhu |
| 7,076,500 | B2 | 7/2006 | Gallant et al. |
| 7,409,433 | B2 | 8/2008 | Lowery et al. |
| 2004/0236824 | A1 | 11/2004 | Millington et al. |
| 2008/0201331 | A1* | 8/2008 | Eriksen ............. G06F 17/30902 |
| 2008/0294847 | A1* | 11/2008 | Maruyama ............ G06F 12/126 711/133 |
| 2009/0100228 | A1 | 4/2009 | Lepeska et al. |
| 2010/0309915 | A1* | 12/2010 | Pirbhai ............. H04L 29/12028 370/392 |
| 2012/0089700 | A1 | 4/2012 | Safruti et al. |
| 2012/0151016 | A1 | 6/2012 | Wein et al. |
| 2012/0209996 | A1* | 8/2012 | Kitamura ............. H04L 61/103 709/224 |

FOREIGN PATENT DOCUMENTS

| | | |
|---|---|---|
| EP | 1122658 A1 | 8/2001 |
| JP | 2008165363 A | 7/2008 |
| WO | 0005661 A1 | 2/2000 |
| WO | 2008101213 A1 | 8/2008 |

OTHER PUBLICATIONS

G. Barish et al., "World Wide Web Caching: Trends and Techniques", IEEE, IEEE Communications Magazine, vol. 38, No. 5, May 2000, pp. 178-185.

B. Smith et al., "Exploiting Result Equivalence in Caching Dynamic Web Content", USENIX, Proceedings of the 2nd Conference on USENIX Symposium on Internet Technologies and Systems, vol. 2, pp. 209-220, 1999.

Anonymous, "Moodie MDL-29686", Internet Archive, Nov. 18, 2011, retrieved Feb. 19, 2015, <https:web.archive.org/web/20111118084653/http://tracker.moodle.org/browse/MDL-29686>.

Anonymous, "How to test for "If-Modified_Since" HTTP Header support", Internet Archive, Feb. 11, 2010, retrieved Feb. 19, 2015, <https://web.archive.org/web/20100211163444/http://stackoverflow.com/questions/2208288/how-to-test-for-if-modified-since-http-header-support>.

International Searching Authority, Written Opinion of the International Searching Authority for International Application No. PCT/IB2013/056442, mailed Jan. 28, 2014.

Foreign Search Report, Patents Act 1977: Search Report under Section 17(5), Application No. GB1214824.3, dated Nov. 30, 2012, 6 pages.

\* cited by examiner

MANAGING A DATA CACHE FOR A COMPUTER SYSTEM

BACKGROUND

The present invention relates to managing a data cache for a computer system.

Computer systems commonly comprise one or more caches arranged to speed up the provision of data across the system. A copy of data from an original data source is stored in the cache. In response to a request for the data, the requested data is provided from the cache instead of the data of from the original data source. Where data sources are not local to a data requestor, a cache provided locally to the requestor can thus speed up provision of the relevant data. Some data, such as web pages, can be provided with a mechanism, commonly referred to as directives, arranged to prevent data being cached. The hypertext transfer protocol (HTTP) used for communicating data in the form of web pages across networks comprises header fields that can be used to specify such directives that set expected or required behaviours. One such header is a cache control header that can be used by the web page provider to specify whether or not the given page should be cached. However such cache controls are commonly over-specified in that some data may benefit from caching despite such cache controls.

Therefore, there is a need in the art to address the aforementioned problem.

SUMMARY

In an embodiment of the present invention, a processor-implemented method manages a data cache for a computer system. One or more processors maintain a cache for one or more data resources requested by a client process. In response to a request from the client process for a cached data resource, the processors send a first request to a server process for the data resource, and send a second request to the server process for an indication of whether or not the data resource has been modified since the data source was most recently cached. Responses to the first or second requests from the server process are compared with the cached data resources so as to identify whether the response to the second request is inaccurate by: in response to the response to the second request comprising an indication that the data resource in unchanged, comparing the cached copy of the data resource with a copy of the data resource returned in response to the first request so as to determine whether the response to the second request is inaccurate; and in response to the response to the second request comprising a copy of the data resource, comparing the cached copy of the data resource to the copy of the data resource returned in response to the second request so as to determine whether the response to the second request is inaccurate. One or more processors disable caching for the data resource in response to a predetermined number of inaccurate second requests associated with the data resource being identified.

In an embodiment, a computer program product manages a data cache for a computer system. The computer program product comprises a computer readable storage medium having program code embodied therewith. The computer readable storage medium is not a transitory signal per se, and is readable and executable by a processor to perform a method comprising: maintaining a cache for one or more data resources requested by a client process; in response to a request from the client process for a cached data resource: sending a first request to a server process for the data resource; and sending a second request to the server process for an indication of whether or not the data resource has been modified since the data source was most recently cached; comparing responses from the server process to the first or second requests with the cached data resources so as to identify whether the response to the second request is inaccurate by: in response to the response to the second request comprising an indication that the data resource in unchanged, comparing the cached copy of the data resource with a copy of the data resource returned in response to the first request so as to determine whether the response to the second request is inaccurate; and in response to the response to the second request comprising a copy of the data resource, comparing the cached copy of the data resource to the copy of the data resource returned in response to the second request so as to determine whether the response to the second request is inaccurate; and disabling caching for the data resource in response to a predetermined number of inaccurate second requests associated with the data resource are identified.

In an embodiment of the present invention, a computer system comprises a processor, a computer readable memory, and a computer readable storage medium. First program instructions maintain a cache for one or more data resources requested by a client process. Second program instructions, in response to a request from the client process for a cached data resource: send a first request to a server process for the data resource; and send a second request to the server process for an indication of whether or not the data resource has been modified since the data source was most recently cached. Third program instructions compare responses from the server process to the first or second requests with the cached data resources so as to identify whether the response to the second request is inaccurate by: in response to the response to the second request comprising an indication that the data resource in unchanged, comparing the cached copy of the data resource with a copy of the data resource returned in response to the first request so as to determine whether the response to the second request is inaccurate; and in response to the response to the second request comprising a copy of the data resource, comparing the cached copy of the data resource to the copy of the data resource returned in response to the second request so as to determine whether the response to the second request is inaccurate. Fourth program instructions disable caching for the data resource in response to a predetermined number of inaccurate second requests associated with the data resource are identified. The first, second, third, and fourth program instructions are stored on the computer readable storage medium, and the program instructions are executed by the processor via the computer readable memory.

BRIEF DESCRIPTION OF THE DRAWINGS

Preferred embodiments of the invention will now be described, by way of example only, with reference to the following drawings in which.

DETAILED DESCRIPTION

Figure 1:
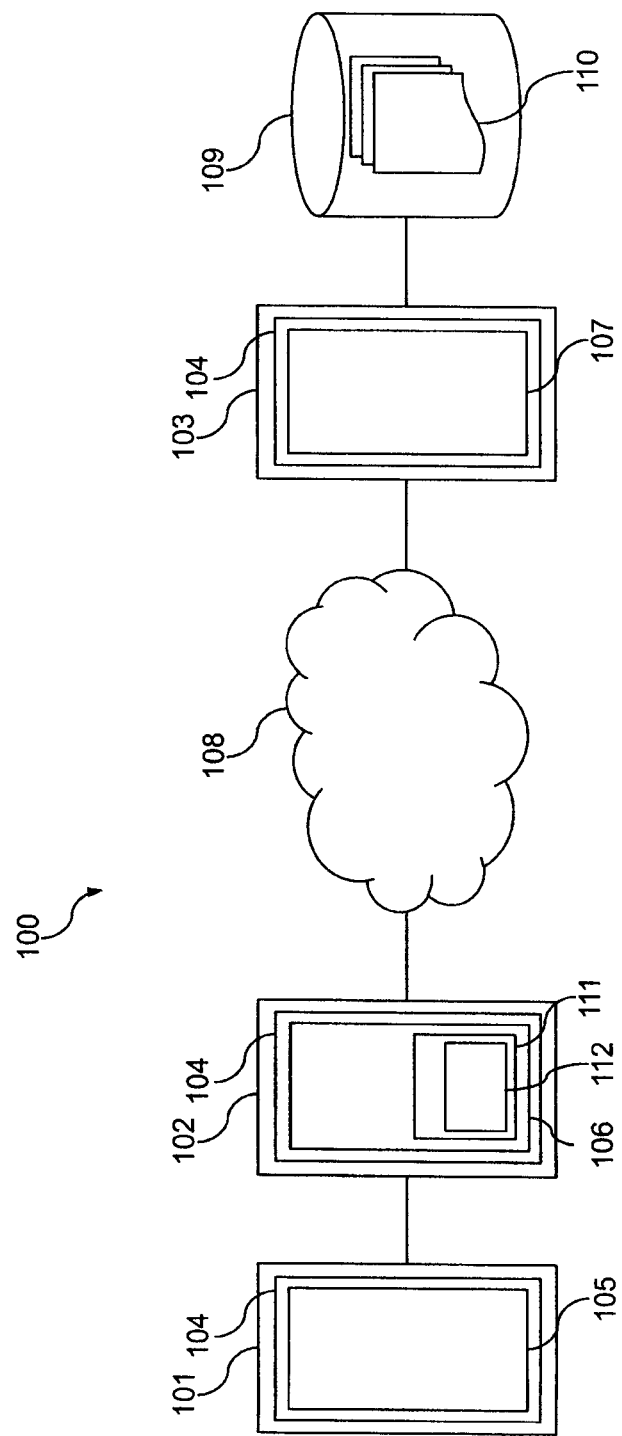
FIG. 1 is a schematic illustration of a computer system comprising a proxy server providing a data cache, in accordance with the prior art, and in which a preferred embodiment of the present invention may be implemented.

With reference to FIG. 1, a computer system 100 comprises a first, second and third computers 101, 102, 103 each loaded with a respective operating system 104 arranged to provide a processing platform or environment for running one or more application programs. The first computer 101 is running a client application program in the form of a web browser application program 105 arranged to enable a user to load and view web pages. The second computer 102 is running a server application program in the form of a proxy server application program 106. The third computer 103 is running a server application program in the form of a web server application program 107. The second and third computers 102, 103 are connected over a network 108. The first computer 101 is provided with a connection to the network 108 via the proxy server 106 provided by the second computer 102. The third computer 103 is connected to a storage device 109 storing data in the form of web pages 110 or other data files or combinations thereof. In a preferred embodiment of the present invention, the client, proxy server and web server applications 105, 106, 107 communicate data using the hypertext transmission protocol (HTTP).

In a preferred embodiment of the present invention, the proxy server 106 comprises a cache manager module 111 arranged to automatically build and maintain a cache 112 of requested data such as the web pages 110. Any request from the web browser application program 105 to view a given web page 110 is passed via the proxy server 106 to the web server 107 via the network 108. The proxy server 106 is arranged to cache a copy of the web page 110 provided in response. The cached copy of a given web page 110 is then used, under predetermined conditions, for servicing subsequent requests from the web browser 105 for the given web page 110.

Figure 2:
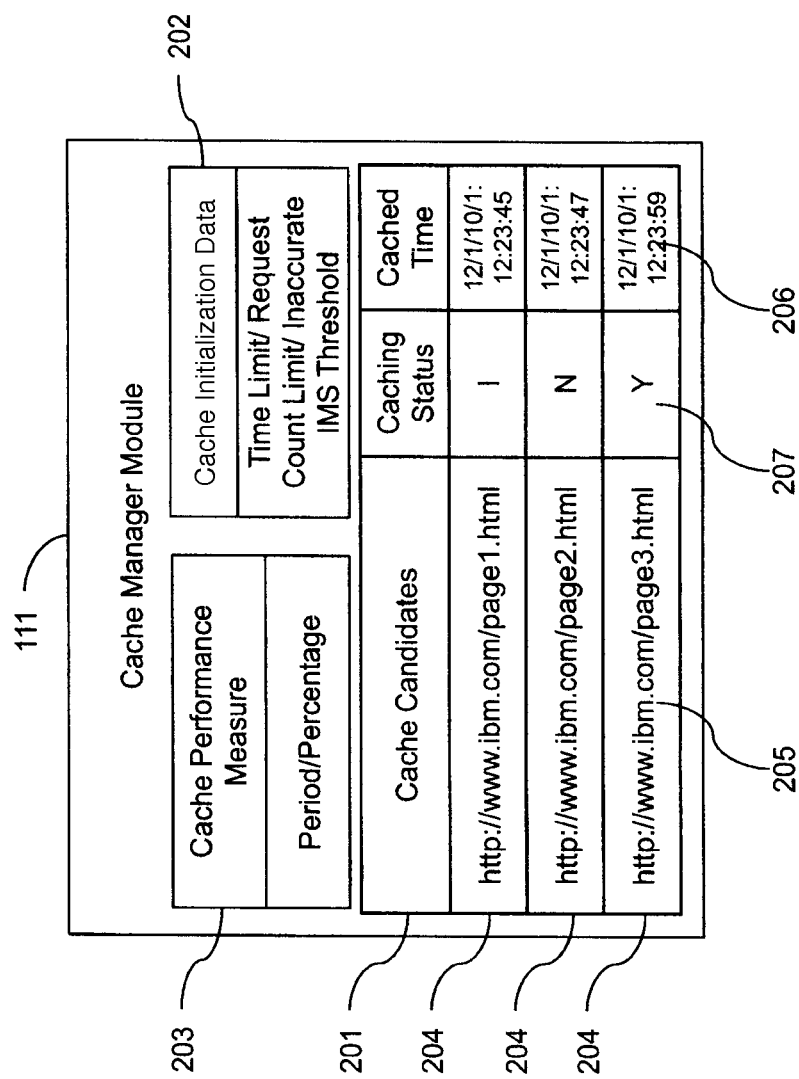
FIG. 2 is a table comprising data for the management of the cache by the proxy server of FIG. 1, in accordance with a preferred embodiment of the present invention.

With reference to FIG. 2, the cache manager module 111 comprises a cache candidate record 201, cache initialization data 202 and a cache performance measure 203. The cache candidate record comprises an entry 204 for each set of data, in the form of a web page 110, which may be cached. Each entry 204 comprises the uniform resource locator (URL) 205 for the relevant web page 110 and a timestamp 206 indicating the time at which the current cache copy of the web page 110 was made. Each entry 204 further comprises a caching status 207 arranged to indicate whether caching is being initialized (I), enabled (Y) or disabled (N) for the relevant web page.

The cache initialization data 202 comprises predetermined data that governs an initialization phase for each cache candidate 201 during which one or more checks are performed to determine whether or not to enable caching for the cache candidate 201. During the initialization phase the caching status 207 for the entry is set accordingly to "I". The cache initialization data 202 defines two limits for the initialization phase. The first limit comprises a predetermined time period. The second limit comprises a predetermined request count, that is, the number of requests for the data resource identified by the entry. The initialization phase ends when either of the first or second limits is met.

During the initialization phase for a given entry 204, the cache manager 111 is arranged to duplicate its requests to the web server 107 for a given web page 110 by requesting the web page 110, as if it were not cached, and also by requesting an indication from the web server 107 as to whether or not the web page 10 has changed since it was most recently received by the cache manager 111, as if the web page 110 were cached. The results of the as-if-cached request and the as-if-not-cached requests are compared to determine whether caching of the web page 110 would be beneficial. In a preferred embodiment of the present invention, the benefit of caching is determined by the accuracy of the response of the web server 107 to the request for an indication from the web server 107 as to whether or not the web page 10 has changed. In the HTTP, such a request to the web server 107 is provided by an if-modified-since (IMS) request for the web page 110. In response to such an IMS request, the web server 107 will return a negative response in the form of a code "304" indicating that the web page 100 is unchanged or a positive response in the form of the updated version of the web page 110.

As noted above, the cache manager 111 is arranged to compare the responses of the parallel IMS (as-if-cached) request and standard (as-if-not-cached) request for the web page 110 to determine whether or not a given IMS request is accurate. If the cache manager 111 receives a "304" response to the IMS request, then the version of the web page 110 received in response to the parallel standard request is compared to the cached copy of the web page 110. If the respective copies are identical, the IMS response is deemed accurate. If the respective copies are not identical, the IMS response is deemed inaccurate. If the cache manager 111 receives and updated version of the web page 110 in response to the IMS request then this updated version is compared to the cached copy of the web page 110. In this case, if the respective copies are identical, the IMS response is deemed inaccurate. If the respective copies are not identical, the IMS response is deemed accurate.

The cache initialization data 202 further defines a threshold for the incidence of inaccurate IMS responses received for a given web page 110 within the initialization phase. If the threshold is met then the IMS response mechanism is deemed inaccurate for the given web page 110 and caching is therefore disabled with the caching status 207 updated from "I" to "N". If the incidence of inaccurate IMS does not meet the threshold then caching is enabled for the given web page and the caching status 207 updated from "I" to "Y". In a preferred embodiment of the present invention, the initialization phase is defined by either fifty page requests or 500 seconds from the first page request, whichever occurs sooner. The skilled person will appreciate that other definitions for the initialization phase could be made. In a preferred embodiment of the present invention, the threshold incidence of inaccurate IMS responses is zero. In other words, if any inaccurate IMS responses are logged in the initialization period then caching is disabled for the relevant cache candidate.

After the initialization phase for a given cache candidate, the cache manager 111 is arranged to continue its processing in accordance with the caching status determined in the initialization phase. In a preferred embodiment of the present invention, the cache manager 111 is provided with the performance measure 203 for use with web pages 110 for which caching has been enabled. The performance measure 203 is arranged to determine whether to disable caching of a given set of data such as a web page 110 where the caching does not meet the performance measure 203. In other words, the cache manager 111 is arranged to measure the provision of the relevant data from the cache and disable caching for the relevant data if such caching provides no performance benefit over retrieving the data directly from its source.

In a preferred embodiment of the present invention the performance measure 203 comprises a predetermined threshold frequency of change for the source data. In other words, if the original web page 110 provided by the web server 107 changes more times in a given time period than the threshold then caching of that web page is disabled. In a preferred embodiment of the present invention, the frequency of change is once within a time period of one minute. The performance measure 203 may also be stated as the frequency of provision of the web page 110 from the web server 107 in place of the cached copy within the predetermined period as a result of change in the web page 110 provided by the web server 107. Thus, the cache manager module 111 is arranged, in response each request for a given initialized cached entry 204, to first determine whether or not the source web page 110 has changed via an IMS request to the server 107. If at any point the frequency of non-304 responses exceeds the threshold then caching is disabled for that cache entry 204 and its caching status updated to "N" accordingly.

Figure 3:
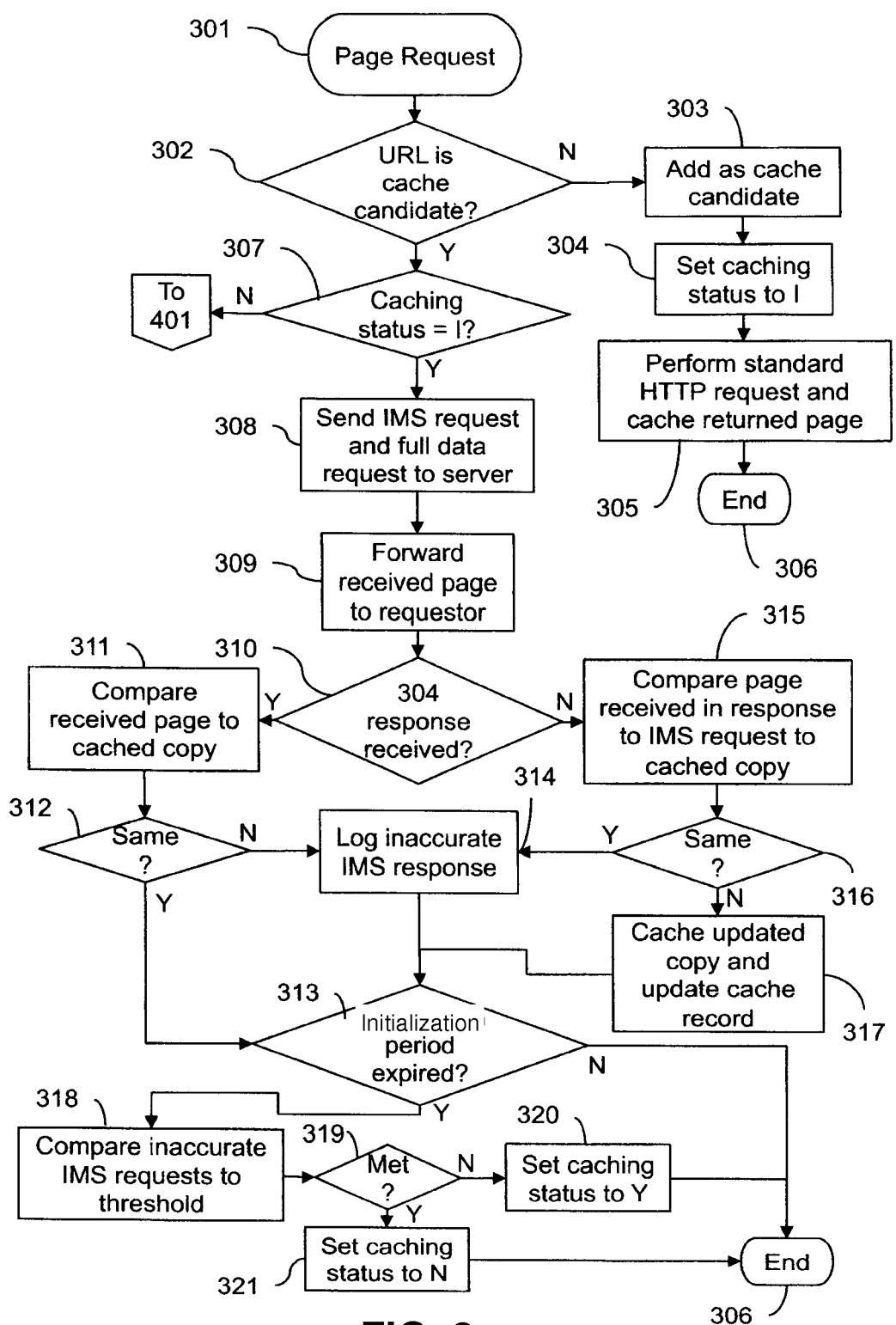
FIG. 3 is a flow chart illustrating processing performed in the proxy server of FIG. 1 when initializing a cache for data in the computer system of FIG. 1, in accordance with a preferred embodiment of the present invention.

The processing performed by the cache manager module 111 in response to a request for data from the web browser 105 will now be described further with reference to the flow chart of FIG. 3. Processing is initiated at step 301 in response to a page request received, in the form of a URL, from a requestor such as the client application 105 and processing moves to step 302. At step 302 the requested URL is checked against the current cache candidates 201 and if not present processing moves to step 303. The newly requested URL is added to the cache candidates and processing moves to step 304. At step 304 the caching status for the new entry is set to "I" and processing moves to step 305. At step 305 the page request is passed to the server 107 and the returned requested page is cached and passed to the requesting client application 105. Processing then moves to step 306 and ends.

If at step 302 the requested URL is a current cache candidate 201 then processing moves to step 307. At step 307 the caching status for the relevant entry is checked and if set to "I" processing moves to step 308. At step 308 an IMS request based on the last access time 206 is sent to the server 107 in parallel with a standard request for the URL and processing moves to step 309. At step 309 the page received in response to the standard request is forwarded to the requesting client application 105 and processing moves to step 310.

At step 310 if a "304" response indicating no change in the requested page since the last access time 206 is received in response to the IMS request then processing moves to step 311. At step 311 the page received in response to the standard page request is compared to the cached copy and processing moves to step 312. At step 312 if the received and cached pages are the same then processing moves to step 313. If at step 312 the received and cached pages are not the same then processing moves to step 314. At step 314 the inaccurate IMS request is logged and processing then moves to step 313.

If at step 310 the response to the IMS request comprises an updated page then processing moves to step 315. At step 315 the page received in response to the IMS request is compared to the cached copy and processing moves to step 316. At step 316 if the received and cached pages are the same then processing moves to step 314 and proceeds as described above. If at step 316 the received and cached pages are not the same then processing moves to step 317. At step 317 the updated page is cached and the cache record updated accordingly. Processing then moves to step 313.

If at step 313 if the initialization period has expired either because the time limit since the first caching of the relevant page has elapsed or the page request limit has been met then processing moves to step 318. At step 318 the number of inaccurate IMS requests logged for the initialization period is compared to the threshold and processing moves to step 319. At step 319 if the threshold has not been met then processing moves to step 320. At step 320 the caching status 207 is set to "Y" so as to enable caching for the relevant entry 204 and processing moves to step 306 and ends. If at step 319 the threshold has been met then processing moves to step 321. At step 321 the caching status 207 is set to "N" so as to disable caching for the relevant entry 204 and processing moves to step 306 and ends.

Figure 4:
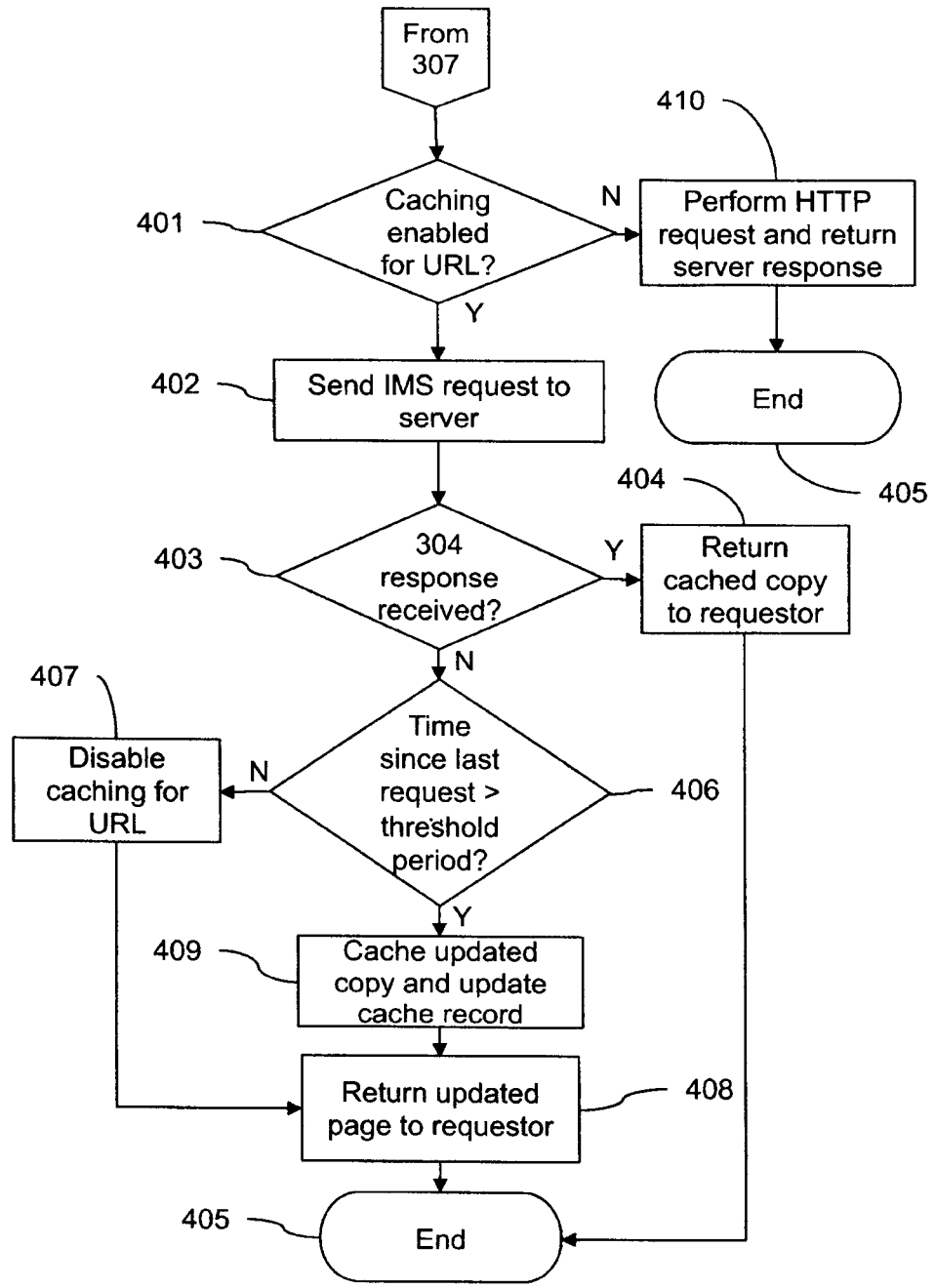
FIG. 4 is a flow chart illustrating processing performed in the proxy server of FIG. 1 when managing requests for data in the computer system of FIG. 1, in accordance with a preferred embodiment of the present invention.

If at step 307 the caching status for the relevant entry is not set to "I" then processing moves to step 401 of FIG. 4. At step 401 if the caching status 207 for the identified entry 204 indicates that caching is enabled for the entry 204 then processing moves to step 402. At step 402 an IMS request comprising data representing the time stamp 206 is sent to the server 107 and processing moves to step 403. At step 403 the response from the server is awaited and if a "304" response is received indicating that the web page 110 is unchanged then processing moves to step 404. At step 404 the cached copy of the web page 110 is returned to the requesting web browser 105 and processing moves to step 405 and ends.

If at step 403 a response is received comprising an updated web page thus indicating that the copy of the web page in the cache 112 is out of date then processing moves to step 406. At step 406 the time since the copy of the data in the cache was made is established from the timestamp 206 and if less than the predetermined period, of one minute in a preferred embodiment of the present invention, then processing moves to step 407. At step 407 caching for the URL is disabled via the caching status 207 in the cache candidate table 201 and processing moves to step 408. At step 408 the updated copy of the web page 110 is forwarded to the requesting web browser 105. Processing then moves to step 405 and ends. If at step 406 the time since the cached copy of the data was saved is greater than the predetermined period then processing moves to step 409. At step 409 the updated copy of the web page 110 is stored in the cache 112 in place of the old copy and the time stamp 206 for the relevant entry 204 in the cache candidate record 201 is updated accordingly and processing then moves to step 408 and proceeds as described above.

If at step 401 the caching status 207 of the relevant entry 204 for the requested URL indicates that caching is disabled then processing moves to step 410 where the request is processed as a non-cached request to the server 107 and the server response returned directly to the requesting web browser 105. Processing then moves to step 405 and ends.

In another embodiment, the incidence of inaccurate IMS responses is checked prior the expiration of the initialization period and if the threshold is exceeded caching is disabled and the initialization process ceased for the relevant data resource. The incidence of inaccurate IMS responses may be checked against the threshold each time the relevant data is requested.

In a further embodiment, the set of cache candidates may be manually modified. In another embodiment, only data sources complying with one or more predetermined criteria are selected as cache candidates. In a further embodiment the initialization phase is applied to data sources specified as not to be cached, that is, associated with a non-cache directive or policy.

In another embodiment, the initialization phase is governed by a time period only. In a further embodiment, the initialization phase is governed by a threshold number of requests for the data recourse only. In another embodiment, the threshold incidence of inaccurate IMS responses is proportional to the total number of requests for the relevant data source. In a further embodiment, the threshold incidence of inaccurate IMS responses comprises a rate of inaccurate IMS responses for the relevant data source.

In a further embodiment, the cache manager is arranged to re-enable caching of a previously disabled data source in response to a predetermined performance measure being met. The performance measure for the re-enabling caching may be the same as that for disabling caching. For example, caching for a given data source may be re-enabled if the data remains unchanged for more than one minute. The re-enabled cache candidate may by subject to a further initialization phase.

In another embodiment, the predetermined performance measure comprises the ratio of change in a given data source with respect to the total number of requests for the resource in a given period.

As will be understood by those skilled in the art any performance measure may be specified that is suitable for a given application of the invention. For example, any time period may be specified in a performance measure including an effectively infinite time period. In other words, the performance measure may comprise the total number of changes in a resource or the ratio of changes to the number of request for a resource since the cache was set up.

In a further embodiment, the cache manager is arranged to measure the size or speed of a request for data from the data source compared to that of checking with the data source that the data remains unchanged and subsequently retrieving the data from the cache. If the requested set of data is relatively small and/or the response from the data source is relatively quick compared with retrieval of the cached data then caching may be disabled for the relevant data source. Such checks may be performed on set-up of the cache or periodically during operation of the cache.

As will be understood by those skilled in the art, any other suitable mechanism for determining whether a data source has been modified. Such other mechanisms may be provided within a given data communication protocol or independently of any such protocol.

As will be understood by those skilled in the art, a data source may be referenced or identified by any suitable means such as a URL or a universal resource identifier (URI or any other suitable identifier, locator, file name or file path.

As will be understood by those skilled in the art, a cache may be used for storing any type of data where storing a local copy of the data is beneficial when compared with accessing such data from its original source. Use of caches is not limited to web page data.

As will be understood by those skilled in the art, embodiments of the invention may be implemented using any other suitable communications protocol at the application, transport, network or other layers such as file transfer protocol (FTP), instant message access protocol (IMAP) or transmission control protocol (TCP).

As will be understood by those skilled in the art, the proxy server application program and its associated cache may be located at any point in the network between the client and server computers or on the client or server computers.

Embodiments of the invention enable the automatic determination of whether caching of a given data source would be beneficial. Embodiments may be arranged to contravene no-cache directives so as to beneficially cache otherwise non-cached data sources. Embodiments of the invention may be applied where one or more of the data sources comprise dynamic content and where IMS responses may be inaccurate.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable iznstructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

Viewed from a first aspect, the present invention provides a method for managing a data cache for a computer system, said method comprising the steps of: maintaining a cache for one or more data resources requested by a client process; in response to a request from said client process for a cached data resource: sending a first request to a server process for said data resource; and sending a second request to said server process for an indication of whether or not said data resource has been modified since said data source was most recently cached; comparing the responses from said server process to said first or second requests with the cached data resources so as to identify whether said response to said second request is inaccurate, the step of comparing comprising: in response to said response to said second request comprising an indication the said data resource in unchanged, comparing said cached copy of said data resource with the copy of said data resource returned in response to said first request so as to determine whether said response to said second request is inaccurate; and in response to said response to said second request comprising a copy of said data resource then said cached copy of said data resource is compared to the copy of said data resource returned in response to said second request so as to determine whether said response to said second request is inaccurate; and disabling caching for said data resource if a predetermined number of inaccurate second requests associated with said data resource are identified.

First and second requests may be sent to the server process in response to requests for the cached data resource for a predetermined initialization phase associated with the cached data resource; and if after the initialization phase fewer than the predetermined number of inaccurate second requests associated with the data resource have been identified then caching may be enabled for the data resource. If caching is disabled for the data resource then after the initialization phase only first requests may be sent to the server process in response to subsequent requests for the cached data source; and if caching is enabled for the data resource then after the initialization phase only second requests may be sent to the server process in response to subsequent requests for the cached data source.

The duration of the initialization phase may be dependent on a predetermined time period. The duration of the initialization phase may dependent on a predetermined number of requests for the associated data resource. The initialization phase may be ended in response to the identification of the predetermined number of inaccurate second requests associated with the data resource. The second requests may comprise HTTP if-modified-since (IMS) requests.

Viewed from a further aspect, the present invention provides an apparatus for managing a data cache for a computer system, said apparatus being operable for: maintaining a cache for one or more data resources requested by a client process; responsive to a request from said client process for a cached data resource: sending a first request to a server process for said data resource; and sending a second request to said server process for an indication of whether or not said data resource has been modified since said data source was most recently cached; comparing the responses from said server process to said first or second requests to the cached data resources so as to identify whether said response to said second request is inaccurate, the step of comparing comprising: the step of comparing comprising: in response to said response to said second request comprising an indication the said data resource in unchanged, comparing said cached copy of said data resource with the copy of said data resource returned in response to said first request so as to determine whether said response to said second request is inaccurate; and in response to said response to said second request comprising a copy of said data resource then said cached copy of said data resource is compared to the copy of said data resource returned in response to said second request so as to determine whether said response to said second request is inaccurate; and disabling caching for said data resource if a predetermined number of inaccurate second requests associated with said data resource are identified.

A further embodiment provides a computer program product for managing a data cache for a computer system, the computer program product comprising a computer-readable storage medium having computer-readable program code embodied therewith, the computer-readable program code configured to: maintain a cache for one or more data resources requested by a client process; in response to a request from the client process for a cached data resource: send a first request to a server process for the data resource; and send a second request to the server process for an indication of whether or not the data resource has been modified since the data source was most recently cached; compare the responses from the server process to the first or second requests so as to identify whether the response to the second request is inaccurate; and disable caching for the data resource if a predetermined number of inaccurate second requests associated with the data resource are identified.

Viewed from a further aspect, the present invention provides a computer program product for managing a data cache for a computer system, the computer program product comprising: a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Embodiments of the invention enable the automatic determination of whether caching of a given data source would be beneficial. Embodiments of the invention may be arranged to contravene no-cache directives so as to beneficially cache otherwise non-cached data sources. Embodiments of the invention may be applied where one or more of the data sources comprise dynamic content and where if-modified-since (IMS) responses may be inaccurate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a data cache for a computer system, the method comprising:
    maintaining a cache for one or more data resources requested by a client process;
    in response to a request from said client process for a cached data resource:
        sending a first request to a server process for said data resource; and
        sending a second request to said server process for an indication of whether or not said data resource has been modified since said data source was most recently cached;
    comparing the responses from said server process to said first or second requests with the cached data resources so as to identify whether said response to said second request is inaccurate by:
        comparing, in response to said response to said second request comprising an indication the said data resource in unchanged, said cached copy of said data resource with the copy of said data resource returned in response to said first request so as to determine whether said response to said second request is inaccurate; and
        comparing, in response to said response to said second request comprising a copy of said data resource, said cached copy of said data resource to the copy of said data resource returned in response to said second request so as to determine whether said response to said second request is inaccurate; and
    disabling caching for said data resource in response to a predetermined number of inaccurate second requests associated with said data resource are identified.

2. The method according to claim 1, further comprising:
    sending first and second requests to said server process in response to requests for said cached data resource for a predetermined initialization phase associated with said cached data resource; and
    enabling, in response to fewer than said predetermined number of inaccurate second requests associated with said data resource have being identified after said initialization phase, caching for said data resource.

3. The method according to claim 2, further comprising:
    sending, in response to caching being disabled for said data resource and after said initialization phase, only first requests to said server process in response to subsequent requests for said cached data source; and
    sending, in response to caching being enabled for said data resource and after said initialization phase, only second requests to said server process in response to subsequent requests for said cached data source.

4. The method according to claim 2, wherein the duration of said initialization phase is dependent on a predetermined time period.

5. The method according to claim 2, wherein the duration of said initialization phase is dependent on a predetermined number of requests for said associated data resource.

6. The method according to claim 2, further comprising:
ending said initialization phase in response to the identification of said predetermined number of inaccurate second requests associated with said data resource.

7. The method according to claim 1, wherein said second requests include HTTP if-modified-since (IMS) requests.

8. A computer program product for managing a data cache for a computer system, the computer program product comprising a computer readable storage medium having program code embodied therewith, wherein the computer readable storage medium is not a transitory signal per se, and wherein the program code is readable and executable by a processor to perform a method comprising:
maintaining, by a proxy server, a cache for one or more data resources requested by a client process executing on a client computer system;
in response to said proxy server receiving a request from said client process for a cached data resource, said proxy server executing the steps of:
sending a first request to a server process executing on a web server for said data resource; and
sending a second request to said server process for an indication of whether or not said data resource has been modified since said data source was most recently cached;
comparing, by said proxy server, responses from said server process to said first or second requests to the cached data resources so as to identify whether a response to said second request is inaccurate, by:
in response to said response to said second request comprising an indication the said data resource in unchanged, comparing said cached copy of said data resource with the copy of said data resource returned in response to said first request so as to determine whether said response to said second request is inaccurate; and
in response to said response to said second request comprising a copy of said data resource then said cached copy of said data resource is compared to the copy of said data resource returned in response to said second request so as to determine whether said response to said second request is inaccurate; and
disabling, by said proxy server, caching for said data resource in response to a predetermined number of inaccurate second requests associated with said data resource being identified.

9. The computer program product according to claim 8, wherein the method further comprises:
sending, by said proxy server in response to requests for said cached data resource for a predetermined initialization phase associated with said cached data resource, first and second requests to said server process; and
enabling, by said proxy server in response to fewer than said predetermined number of inaccurate second requests associated with said data resource have been identified after said initialization phase, caching for said data resource.

10. The computer program product according to claim 9, wherein the method further comprises:
sending, by said proxy server in response to caching being disabled for said data resource, only first requests after said initialization phase to said server process in response to subsequent requests for said cached data source; and
sending, by said proxy server in response to caching being enabled for said data resource, only second requests after said initialization phase to said server process in response to subsequent requests for said cached data source.

11. The computer program product according to claim 9, wherein a duration of said initialization phase is dependent on a predetermined time period.

12. The computer program product according to claim 9, wherein a duration of said initialization phase is dependent on a predetermined number of requests for said associated data resource.

13. The computer program product according to claim 9, wherein the method further comprises:
ending, by said proxy server in response to the identification of said predetermined number of inaccurate second requests associated with said data resource, said initialization phase.

14. The computer program product according to claim 8, wherein said second requests comprise HTTP if-modified-since (IMS) requests.

* * * * *